(12) United States Patent
Chang et al.

(10) Patent No.: US 11,790,929 B2
(45) Date of Patent: Oct. 17, 2023

(54) WPE-BASED DEREVERBERATION APPARATUS USING VIRTUAL ACOUSTIC CHANNEL EXPANSION BASED ON DEEP NEURAL NETWORK

(71) Applicant: IUCF-HYU (INDUSTRY-UNIVERSITY COOPERATION FOUNDATION HANYANG UNIVERSITY), Seoul (KR)

(72) Inventors: Joon Hyuk Chang, Seoul (KR); Joon Young Yang, Seoul (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 150 days.

(21) Appl. No.: 17/615,492

(22) PCT Filed: Aug. 4, 2021

(86) PCT No.: PCT/KR2021/010308
§ 371 (c)(1),
(2) Date: Nov. 30, 2021

(87) PCT Pub. No.: WO2022/031061
PCT Pub. Date: Feb. 10, 2022

(65) Prior Publication Data
US 2023/0178091 A1 Jun. 8, 2023

(30) Foreign Application Priority Data
Aug. 4, 2020 (KR) .......... 10-2020-0097584

(51) Int. Cl.
*G10L 15/00* (2013.01)
*G10L 21/0216* (2013.01)
(Continued)

(52) U.S. Cl.
CPC .......... *G10L 21/0216* (2013.01); *G10L 25/21* (2013.01); *G10L 2021/02082* (2013.01); *G10L 2021/02163* (2013.01)

(58) Field of Classification Search
None
See application file for complete search history.

(56) References Cited

U.S. PATENT DOCUMENTS 10,283,140 B1 * 5/2019 Yu .............. G10L 21/0232
10,490,204 B2 * 11/2019 Markovich Golan .. H04S 7/305
2018/0350379 A1 * 12/2018 Wung ............... G10L 21/038

FOREIGN PATENT DOCUMENTS

KR  10-0636167 B1  10/2006
KR  10-1334991 B1  12/2013
(Continued)

OTHER PUBLICATIONS

K. Kinoshita, M. Delcroix, H. Kwon, T. Mori, and T. Nakatani, 'Neural Network-Based Spectrum Estimation for Online WPE Dereverberation', in Interspeech, 2017, pp. 384-388. (Year: 2017).*

*Primary Examiner* — Bhavesh M Mehta
*Assistant Examiner* — Uthej Kunamneni
(74) *Attorney, Agent, or Firm* — Sughrue Mion, PLLC (57) ABSTRACT

According to an aspect, a WPE-based dereverberation apparatus using virtual acoustic channel expansion based on a deep neural network includes a signal reception unit for receiving as input a first speech signal through a single channel microphone, a signal generation unit for generating a second speech signal by applying a virtual acoustic channel expansion algorithm based on a deep neural network to (Continued)

the first speech signal and a dereverberation unit for removing reverberation of the first speech signal and generating a dereverberated signal from which the reverberation has been removed by applying a dual-channel weighted prediction error (WPE) algorithm based on a deep neural network to the first speech signal and the second speech signal.

10 Claims, 6 Drawing Sheets

(51) Int. Cl.
    *G10L 25/21*      (2013.01)
    *G10L 21/0208*      (2013.01)

(56) References Cited

FOREIGN PATENT DOCUMENTS

| | | |
|---|---|---|
| KR | 10-2016-0073874 A | 6/2016 |
| KR | 10-1704926 B1 | 2/2017 |

\* cited by examiner

| Model | Small | | | | Medium | | | | Large | | | |
|---|---|---|---|---|---|---|---|---|---|---|---|---|
| | PESQ | CD | LLR | SRMR | PESQ | CD | LLR | SRMR | PESQ | CD | LLR | SRMR |
| Unprocessed ($x_1$) | 3.34 | 0.56 | 0.03 | 3.27 | 2.08 | 1.84 | 0.17 | 2.63 | 1.75 | 2.37 | 0.25 | 2.39 |
| Single-channel WPE ($z_1$) | 3.86 | 1.54 | 0.09 | 3.39 | 3.07 | 1.63 | 0.12 | 3.13 | 2.71 | 1.71 | 0.14 | 2.99 |
| VACE-WPE ($z_1$) | 3.93 | 1.22 | 0.06 | 3.39 | 3.19 | 1.41 | 0.11 | 3.27 | 2.87 | 1.53 | 0.13 | 3.30 |
| VACE-WPE ($z_v$) | 1.11 | 4.65 | 0.93 | 2.36 | 1.20 | 4.08 | 0.73 | 2.31 | 1.20 | 4.16 | 0.72 | 2.11 |
| Dual-channel WPE (actual) | 3.86 | 1.05 | 0.05 | 3.38 | 3.31 | 1.29 | 0.08 | 3.28 | 2.96 | 1.32 | 0.10 | 3.11 |

[Fig 6]

WPE-BASED DEREVERBERATION APPARATUS USING VIRTUAL ACOUSTIC CHANNEL EXPANSION BASED ON DEEP NEURAL NETWORK

CROSS REFERENCE TO RELATED APPLICATIONS

This application is a National Stage of International Application No. PCT/KR2021/010308 filed Aug. 4, 2021, claiming priority based on Korean Patent Application No. 10-2020-0097584 filed Aug. 4, 2020.

TECHNICAL FIELD

The present invention relates to a WPE-based dereverberation apparatus using virtual acoustic channel expansion based on a deep neural network (DNN), and more specifically, to a technology using virtual acoustic channel expansion based on a deep neural network so that reverberation can be removed efficiently using a dual-channel WPE algorithm even in a single-channel speech signal environment.

BACKGROUND

If a speech signal is uttered in a reverberant enclosure, the sound waves are reflected by walls, ceilings, obstacles, or the like. Therefore, a microphone for collecting speech signals may receive as input both the speech signal uttered at the current time point and speech signals uttered at the past time points and delayed in time.

In this case, the input signals to the microphone in the time-domain may be expressed by a convolution operation between impulse responses between a speech source and the microphone. The impulse response at this time is called a room impulse response (RIR).

The input signals to the microphone consist broadly of a first component and a second component. The first component is an early-arriving speech component, and refers to a component of a signal for which sound waves are collected in a direct path having no reverberation or a path having relatively little reverberation. The second component is a late reverberation component, that is, a reverberation component, collected through a highly reverberant path.

Here, the second component (reverberation component) is a component that not only makes a speech signal audibly less pleasing, but also degrades the performance of an applied technology such as speech recognition or speaker recognition that operates by receiving speech signals as input. Accordingly, there is a need for an algorithm for removing such a reverberation component.

The weighted prediction error (WPE) algorithm is an algorithm for removing the late reverberation component as described above.

Specifically, the WPE is an algorithm of the type that converts a speech signal in the time domain into that of a frequency domain using the short-time Fourier transform (STFT), and estimates and removes reverberation components at the present time point from speech samples of the past time points using a multi-channel linear prediction (MCLP) technique in the frequency domain.

In general, the WPE algorithm puts out a single output when a single-channel signal is inputted, and puts out a multi-channel output when a multi-channel speech signal is inputted.

In this case, reverberation components can be more effectively removed when a multi-channel speech signal collected through a microphone array consisting of a plurality of microphones is given than when only a single-channel speech signal collected through a single microphone is given. In other words, it can be said that the performance of the multi-channel WPE algorithm is better than that of the single-channel WPE algorithm.

On the other hand, in the prior art literature "Virtually increasing microphone array elements by interpolation in complex-logarithmic domain," H. Katahira, N. Ono, S. Miyabe, T. Yamada, and S. Makino, EUSIPCO, 2013," when signals collected through two microphones are given, a technique has been proposed for creating a new virtual microphone signal by interpolating these two signals in the complex-logarithmic domain. Specifically, the technique described above used a method of applying interpolation, respectively, to magnitude and phase calculated from STFT coefficients. The prior art literature has shown that noises can be effectively removed by applying a plurality of virtual microphone signals generated to a specific type of beamformer.

The biggest difference between the technique disclosed in the prior art literature and the present invention is that the technique of the prior art literature creates a virtual microphone signal through interpolation based on signals collected through two microphones, whereas the method proposed in the present invention generates a virtual channel speech signal in order to use a multi-channel dereverberation algorithm, assuming a situation that a speech signal collected by only one microphone is given.

SUMMARY OF INVENTION

Technical Objects

It is an object of the present invention to provide a WPE-based dereverberation apparatus using virtual acoustic channel expansion based on a deep neural network that can use a dual-channel WPE algorithm when only a single-channel speech signal is given, in order to effectively remove reverberation components from the single-channel speech signal collected in a reverberant enclosure.

It is another object of the present invention to provide a WPE-based dereverberation apparatus that can generate a virtual acoustic channel speech signal using a deep neural network and can remove reverberation components with better performance than a single-channel WPE through a dual-channel WPE algorithm.

According to an aspect, a WPE-based dereverberation apparatus using virtual acoustic channel expansion based on a deep neural network includes a signal reception unit for receiving as input a first speech signal through a single channel microphone, a signal generation unit for generating a second speech signal by applying a virtual acoustic channel expansion algorithm based on a deep neural network to the first speech signal and a dereverberation unit for removing reverberation of the first speech signal and generating a dereverberated signal from which the reverberation has been removed by applying a dual-channel weighted prediction error (WPE) algorithm based on a deep neural network to the first speech signal and the second speech signal.

The signal generation unit may receive a real part and an imaginary part of an STFT coefficient of the first speech signal as input, and outputs a real part and an imaginary part of an STFT coefficient of the second speech signal.

The WPE-based dereverberation apparatus may include a power estimation unit for estimating power of the dereverberated signal of the first speech signal, based on the first speech signal and the second speech signal by using a power estimation algorithm based on a deep neural network.

The power estimation unit may provide power estimation value of the dereverberated signal to the dereverberation unit, and the dereverberation unit may remove the reverberation included in the first speech signal by using the power estimation value.

The WPE-based dereverberation apparatus may learn after the power estimation algorithm of the power estimation unit is subjected to learning to receive the first speech signal containing a reverberation component as input and to estimate the power of the dereverberated signal, the virtual acoustic channel expansion algorithm of the signal generation unit is subjected to learning.

The learning of the virtual acoustic channel expansion algorithm of the signal generation unit may comprise a pre-training stage and a fine-tuning stage, and the pre-training stage is carried out by performing a self-regression task that allows the virtual acoustic channel expansion algorithm to estimate the same real part and imaginary part as an inputted signal.

The fine-tuning stage may learn the virtual acoustic channel expansion algorithm is subjected to learning so that an output signal derived by passing a virtual channel speech signal and an actually observed speech signal through dual-channel WPE approaches an early-arriving signal.

The power estimation algorithm may not be subjected to learning during the pre-training stage and the fine-tuning stage.

The virtual acoustic channel expansion algorithm may include a U-Net architecture using a gated linear unit (GLU) instead of a general convolution operation.

The virtual acoustic channel expansion algorithm may perform a 2D convolution operation with a stride of (2, 2) without performing max-pooling when down-sampling a feature map.

EFFECTS OF THE INVENTION

The WPE-based dereverberation apparatus using virtual acoustic channel expansion based on a deep neural network of the present invention has an effect of being able to obtain excellent performance by using a dual-channel WPE through virtual acoustic channel expansion without using a single-channel WPE and without increasing the number of microphones in order to remove reverberation components when only a speech signal collected by one microphone is given.

In addition, the WPE-based dereverberation apparatus using virtual acoustic channel expansion based on a deep neural network of the present invention proposes a method of solving the problem from an algorithmic point of view instead of increasing the number of microphones, and has an effect of being able to dramatically reduce the cost required to install additional microphones.

DETAILED DESCRIPTION OF EMBODIMENTS

Configurations illustrated in the embodiments and the drawings described in the present specification are only the preferred embodiments of the present disclosure, and thus it is to be understood that various modified examples, which may replace the embodiments and the drawings described in the present specification, are possible when filing the present application.

The terms used in the present specification are used to describe the embodiments of the present disclosure. Accordingly, it should be apparent to those skilled in the art that the following description of exemplary embodiments of the present invention is provided for illustration purpose only and not for the purpose of limiting the invention as defined by the appended claims and their equivalents. It is to be understood that the singular forms "a," "an," and "the" include plural referents unless the context clearly dictates otherwise.

It will be understood that when the terms "includes," "comprises," "including," and/or "comprising," when used in this specification, specify the presence of stated features, figures, steps, components, or combination thereof, but do not preclude the presence or addition of one or more other features, figures, steps, components, members, or combinations thereof.

It will be understood that, although the terms first, second, etc. may be used herein to describe various components, these components should not be limited by these terms.

Hereinafter, embodiments of the present disclosure will be described in detail with reference to the accompanying drawings so that the present disclosure may be readily implemented by those skilled in the art. In the drawings, parts irrelevant to the description are omitted for the simplicity of explanation.

Figure 1:
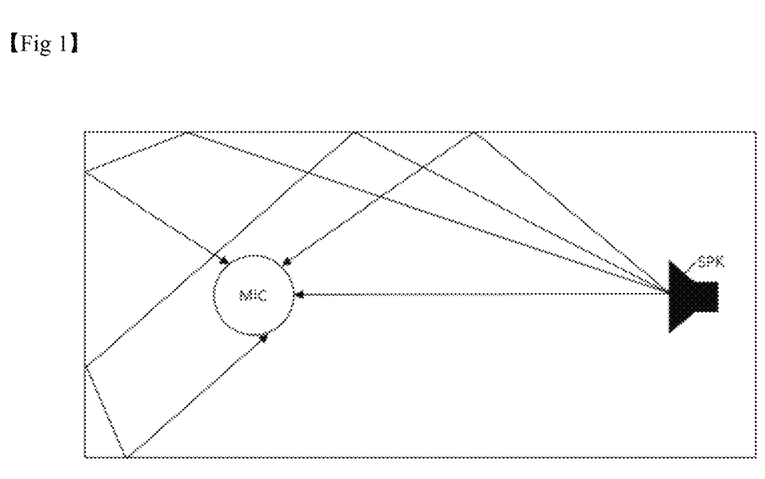
FIG. 1 is a diagram showing a method of inputting a speech signal using a single-channel microphone in a reverberant environment in accordance with an embodiment of the present invention.

FIG. 1 is a diagram showing a method of inputting a speech signal using a single-channel microphone in a reverberant environment in accordance with an embodiment of the present invention.

Referring to FIG. 1, a WPE-based dereverberation apparatus using virtual acoustic channel expansion based on a deep neural network can effectively remove reverberation by applying only speech signals inputted through a single-channel microphone MIC to dual-channel WPE using virtual acoustic channel expansion based on a deep neural network. The WPE described herein may refer to a weighted prediction error based on a deep neural network.

The present invention will be described by assuming a scenario in which speech signals are collected using a single-channel microphone MIC in a noiseless reverberant enclosure for the convenience of description, but the principle of the present invention can be likewise extended and applied even in an environment in which background noise is present.

As shown in FIG. 1, speech signals generated from an utterance source SPK may be inputted to a single-channel microphone MIC. In this case, even for the speech signals generated at the same time, the time point of reaching the single-channel microphone MIC may vary depending on the path of their sound waves.

Accordingly, it is assumed herein that a speech signal is composed of the sum of a first component and a second component. The first component may be a component (i.e., an early-arriving signal) inputted through a direct path or a path with less severe reverberation from the utterance source SPK to the single-channel microphone MIC, and the second component may be a component (i.e., a reverberant signal) inputted through a highly reverberant path.

$$X_{t,f} = X_{t,f}^{(1)} + X_{t,f}^{(2)} \quad \text{(Eq. 1)}$$

In Eq. 1, X denotes a speech signal in the short-time Fourier transform (STFT) domain, and t and f denote a time-frame index and a frequency index of the short-time Fourier transform coefficient.

At this time, the first term representing the first component corresponds to a region formed by cutting from the start point of a room impulse response (RIR) to the point 50 ms after the main peak, and is assumed to be calculated through a convolution operation between the truncated RIR and a source speech. The first term may be considered as an ideal speech signal in which the second component (i.e., the reverberation component) is completely removed and only the first component remains.

Since reverberation components inputted into the single-channel microphone MIC significantly reduces the accuracy of speech and sound signal processing processes such as speech recognition, direction estimation, speech modeling, and location estimation, effectively removing reverberation components is always an essential element in the field of speech signal processing.

Hence, if speech signals are inputted using a single-channel microphone, they can be applied to a dual-channel WPE by using virtual acoustic channel expansion based on a deep neural network.

In other words, a method of estimating reverberation time based on multi-channel microphones using a deep neural network in accordance with an embodiment can utilize the relative spatial information between input signals for estimation, by using the multi-channel microphones, as well as can estimate the degree of reverberation by modeling the nonlinear distribution between feature vectors that can well represent the reverberation characteristics of a space using a deep neural network, which is a deep structure-based machine learning technique.

In the present invention, such virtual acoustic channel expansion technique is applied based on the WPE algorithm for dereverberation, but the present invention is not limited thereto. According to an embodiment, the virtual acoustic channel expansion method may also be applied to a multi-channel denoising algorithm such as a parametric multi-channel Wiener filter (PMWF) for denoising.

According to an embodiment, even when using multi-channel microphones of a structure employed in various environments such as mobile devices and IoT devices, it is possible to provide a dereverberation method that compensates for the shortcomings and improves robustness in accuracy and noise by using the WPE-based dereverberation apparatus using virtual acoustic channel expansion based on a deep neural network of the present invention.

Figure 2:
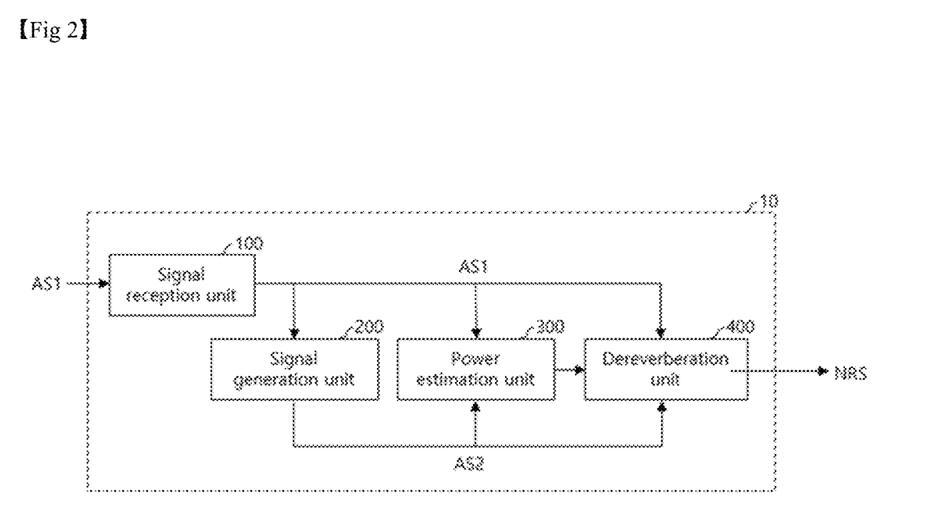
FIG. 2 is a diagram showing a WPE-based dereverberation apparatus using virtual acoustic channel expansion based on a deep neural network in accordance with an embodiment of the present invention.

FIG. 2 is a diagram showing a WPE-based dereverberation apparatus 10 using virtual acoustic channel expansion based on a deep neural network in accordance with an embodiment of the present invention.

The WPE-based dereverberation apparatus 10 in accordance with an embodiment of the present invention is relevant to all research areas using a dereverberation algorithm as a pre-processing module when using a speech application by using a single microphone in a highly reverberant space such as a room or lecture hall. In particular, it may be applied to artificial intelligence speakers, robots, portable terminals, and so on that use speech applications in an environment where reverberation exists, so as to improve the performance of the technology (speech recognition, speaker recognition, etc.) implemented by the application.

In addition, the WPE-based dereverberation apparatus 10 in accordance with an embodiment of the present invention is applicable to an application for the purpose of performing speech recognition or speaker recognition by using artificial intelligence speakers, robots, portable terminals, and so on, and is more effective when only one microphone has to be used to reduce costs structurally, in particular.

Referring to FIG. 2, the WPE-based dereverberation apparatus 10 using virtual acoustic channel expansion based on a deep neural network in accordance with an embodiment of the present invention may include a signal reception unit 100, a signal generation unit 200, a power estimation unit 300, and a dereverberation unit 400.

The signal reception unit 100 is a constituent corresponding to the single-channel microphone MIC shown in FIG. 1, and may receive a first speech signal AS1 from the single-channel microphone MIC. In this case, the first speech signal AS1 is a signal inputted from the utterance source SPK shown in FIG. 1 and includes a reverberation component.

The signal generation unit 200 may generate a second speech signal AS2 by applying virtual acoustic channel expansion (VACE) based on a deep neural network to the first speech signal AS1. The second speech signal AS2 may be a virtual channel speech signal. A virtual acoustic channel expansion method based on a deep neural network of the signal generation unit 200 will be described in more detail with reference to FIG. 3.

The power estimation unit 300 can estimate the power of a dereverberated signal of the first speech signal AS1 based on the first speech signal AS1 and the second speech signal AS2 by using a power estimation algorithm based on a deep neural network. The power estimation unit 300 may provide a power estimation value of the dereverberated signal NRS to the dereverberation unit 400.

The dereverberation unit 400 may remove the reverberation (e.g., late reverberation) of the first speech signal AS1 by applying the dual-channel WPE based on a deep neural network to the first speech signal AS1 and the second speech signal AS2. And, the dereverberation unit 400 may output the dereverberated signal NRS from which the reverberation has been removed. The dereverberation unit 400 may remove the reverberation included in the first speech signal AS1 by using the power estimation value.

For example, the power estimation unit 300 and the dereverberation unit 400 may constitute a dual-channel WPE system. According to an embodiment, the power estimation unit 300 and the dereverberation unit 400 may be integrated and implemented integrally.

In the following, a WPE-based dereverberation method utilizing a deep neural network will be described.

Classical WPE dereverberation techniques use a linear prediction filter to estimate the reverberation component of an input signal, and subtract the reverberation component estimated through the linear prediction from the input signal, thereby calculating an estimated value of maximum likelihood (ML) of a signal from which the reverberation has been removed. Since a closed form solution for estimating such a linear prediction filter does not exist, it is necessary to estimate the coefficients of the filter in an iterative manner, and the process can be expressed as the following equations.

$$\lambda_{t,f} = \frac{1}{D}\sum d|Z_{d,t,f}|^2 \quad \text{(Eq. 2)}$$

$$R_f = \sum_t \frac{\tilde{X}_{t-\Delta,f}\tilde{X}_{t-\Delta,f}}{\lambda_{t,f}} \in C^{DK \times DK} \quad \text{(Eq. 3)}$$

$$P_f = \sum_t \frac{\tilde{X}_{t-\Delta,f}\tilde{X}_{t,f}}{\lambda_{t,f}} \in C^{DK \times D} \quad \text{(Eq. 4)}$$

$$G_f = R_f^{-1} P_f \in C^{DK \times D} \quad \text{(Eq. 5)}$$

$$Z_{t,f} = X_{t,f} - G_f^H \tilde{X}_{t-\Delta,f} \quad \text{(Eq. 6)}$$

Here, $Z_{d,t,f}$ denotes an estimated value of an early-arriving signal estimated through the linear prediction technique, $\lambda_{t,f}$ denotes the power at the time-frequency bin (t, f) of the early-arriving signal estimated, and K denotes the order of the linear prediction filter.

$\Delta$ denotes the delay of the linear prediction algorithm, and $\tilde{X}_{t-\Delta,f}$ and G denote a stacked representation obtained by stacking the STFT coefficient of the input signal to the microphone and the coefficient of the linear prediction filter, respectively, from the $\Delta^{th}$ frame in the past to the $(\Delta+K-1)^{th}$ frame in the past based on the current frame t.

On the other hand, the WPE dereverberation method utilizing a deep neural network in accordance with an embodiment of the present invention replaces a part of the classical WPE algorithm described above with a logic utilizing a deep neural network.

More specifically, the part for estimating the power of the early-arriving signal in Eq. 6 is replaced with a deep neural network. In this case, the deep neural network may be subjected to learning to receive the power of the input signal to the microphone and to estimate the power of $Z_{d,t,f}$ from which the reverberation component has been removed. This is a method of subjecting the deep neural network to learning for the purpose of removing the reverberation component from both the speech component and the noise component.

Once the learning of the deep neural network is completed, a power estimation value of the early-arriving signal for each channel may be calculated using the deep neural network, and then the average may be taken for all channels, to calculate the power estimation value that can replace $\lambda_{t, f}$, the left-hand side of Eq. 2. Thereafter, the STFT coefficient of the early reflection signal may be estimated through the processes of Eq. 3 to Eq. 6.

The deep neural network for estimating the power of the early-arriving signal may be subjected to learning to minimize the mean squared error (MSE) between the estimated power of the early-arriving signal and the power of the correct early-arriving signal. At this time, the LPS converted into log-scale by taking the log of the power is used as the actual input/output, and when applied to the WPE algorithm, it can be applied after converting back to the linear-scale through an exponential operation.

Figure 3:
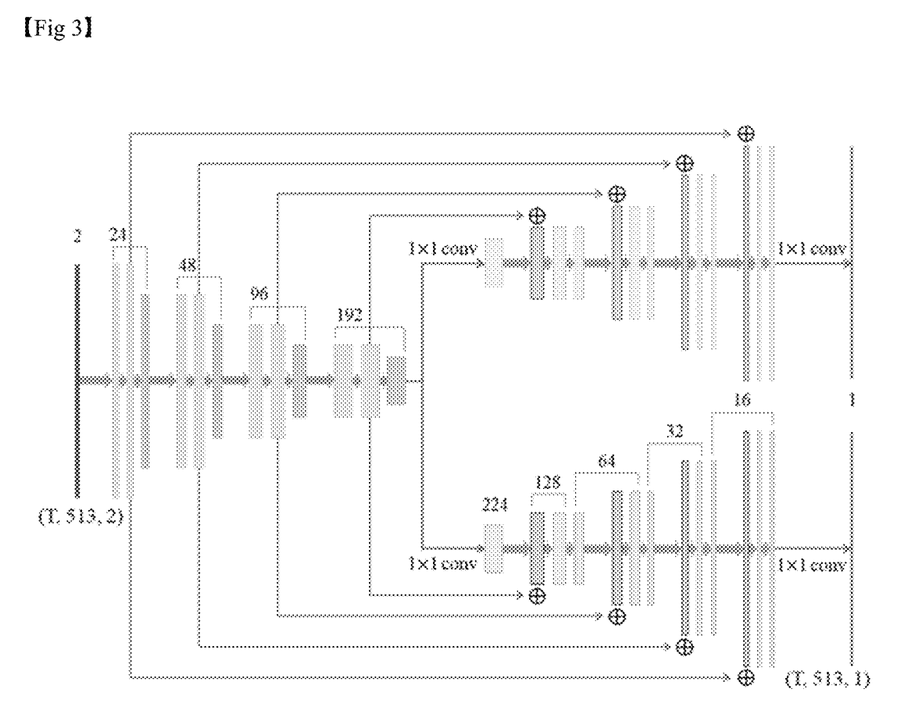
FIG. 3 is a diagram showing the structure of a deep neural network for virtual acoustic channel expansion (VACE) in accordance with an embodiment of the present invention.

FIG. 3 is a diagram showing the structure of a deep neural network for virtual acoustic channel expansion (VACE) in accordance with an embodiment of the present invention. In this case, the signal generation unit 200 shown in FIG. 2 may include the deep neural network for virtual acoustic channel expansion shown in FIG. 3.

Referring to FIG. 3, the deep neural network for virtual acoustic channel expansion may receive as input the real part and the imaginary part of the STFT coefficient of a given first speech signal, and output the real part and the imaginary part of the STFT coefficient of a second speech signal.

In the present invention, the U-Net (U-Net: Convolutional Networks for Biomedical Image Segmentation) architecture was adopted for the virtual acoustic channel expansion, and some settings were changed and applied. U-Net basically consists of a convolutional encoder-decoder structure, and is characterized by an operation that concatenates the feature map of the encoder and the feature map of the decoder.

The settings of the U-Net architecture changed in the present invention are as follows.

When down-sampling the feature map, a 2D convolution operation with a stride of (2, 2) was used without max-pooling.

A gated linear unit (GLU) was used instead of a general convolution operation, and in this case, a general convolution operation was used instead of a GLU in the convolution operation serving as down-sampling and up-sampling.

A 1×1 convolution operation was used in the bottleneck part of the network.

A separate decoder stream was used to estimate the real part and the imaginary part of the STFT coefficient of the second speech signal in the decoding path.

Except for the above changes, a model was constructed to be the same as the existing U-Net architecture. In FIG. 3, wide arrows all denote 2D convolution operations in which the kernel size is 3.

The deep neural network for virtual acoustic channel expansion of the present invention may use a loss function of the form as below for learning.

$$L_1^{freq}(A,B) = MSE(A^r+B^r) + MSE(A^i+B^i) + \alpha*MSE(\ln|A|, \ln|B|) \quad \text{(Eq. 7)}$$

$$L_1^{time}(a,b) = MAE(a,b) \quad \text{(Eq. 8)}$$

$$L_1(A,B) = L_1^{freq}(A,B) + \beta*L_1^{time}(a,b) \quad \text{(Eq. 9)}$$

In this case, A and B denote the STFT coefficients, the superscripts r and i denote the real and imaginary parts of the STFT coefficients, |A| and |B| denote magnitude spectra, and a and b denote time-domain signals obtained by taking the inverse STFT of A and B. $\alpha$ and $\beta$ are scaling factors for matching the scale between the loss functions defined in the different domains representing signals. MSE denotes the mean square error, and MAE denotes the mean absolute error.

Figure 4:
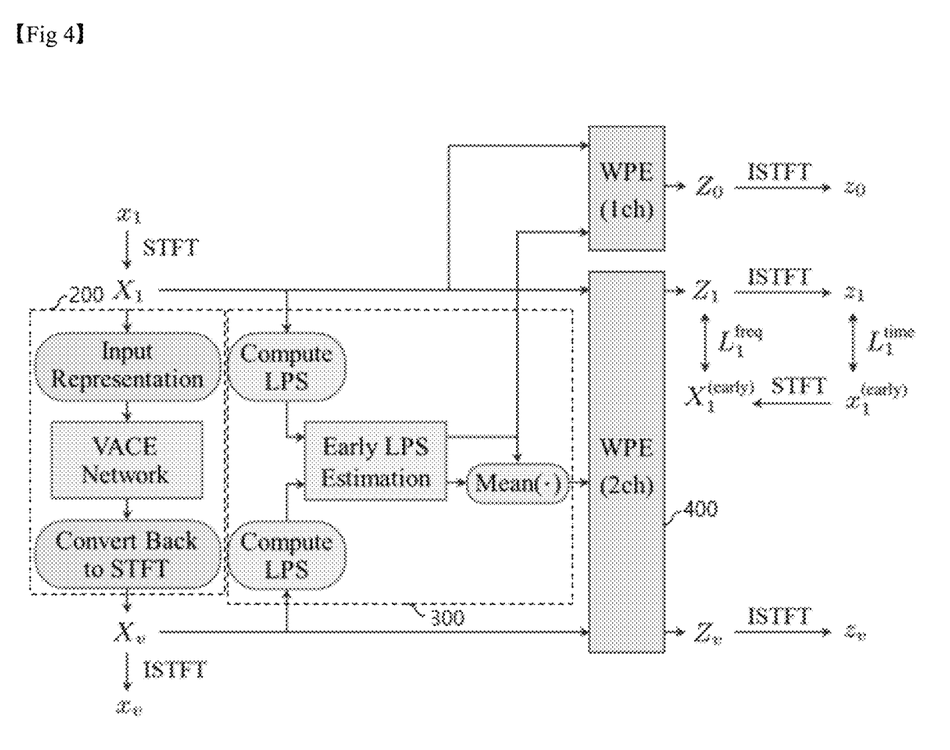
FIG. 4 is a diagram showing a detailed structure of a WPE-based dereverberation apparatus using virtual acoustic channel expansion based on a deep neural network in accordance with an embodiment of the present invention

FIG. 4 is a diagram showing a detailed structure of a WPE-based dereverberation apparatus using virtual acoustic channel expansion based on a deep neural network in accordance with an embodiment of the present invention. Although a single-channel WPE system is shown together as a comparative example for the convenience of description, the present invention is not limited thereto.

Referring to FIG. 4, in order to start learning of the deep neural network of virtual acoustic channel expansion (hereinafter, VACENet), the VACENet must first be integrated into a WPE system based on a pre-learned deep neural network. In this case, the VACENet may correspond to the signal generation unit 200 shown in FIG. 1, and the WPE system may correspond to the power estimation unit 300 and the dereverberation unit 400.

FIG. 4 shows a block diagram of a VACE-WPE system in which the VACENet and the dual-channel WPE are integrated.

In FIG. 4, lowercase letters all denote time-domain speech signals, and uppercase letters all denote STFT domain speech signals.

$x_1$ and $x_v$ denote a given single-channel speech signal and a virtual channel speech signal generated through VACENet, respectively.

$Z_1$ and $Z_v$ denote the STFT coefficients of dereverberated signals obtained by passing $X_1$ and $X_2$ through the dual-channel WPE, respectively.

$Z_0$ denotes the STFT coefficient of a dereverberated signal obtained by passing the given single-channel speech signal through a single-channel WPE serving as a comparative example.

$X_1^{(1)}$ denotes an ideal early-arriving signal from which reverberation has been completely removed, which is intended to be ultimately obtained through the WPE algorithm.

In order to construct the WPE-based dereverberation apparatus in accordance with an embodiment of the present invention, a WPE algorithm based on a deep neural network needs to be prepared first. In particular, since the WPE is a fixed algorithm, a neural network (i.e., LPSNet) for estimating the log-scale power spectra (LPS) of the early-arriving speech signal required as a component of the deep neural network-based WPE must be learned in advance. The LPSNet is subjected to learning to receive the LPS of a signal containing reverberation as input and to estimate the LPS of the early-arriving signal.

Next, it is necessary to subject the neural network (i.e., VACENet), which serves to receive a given single-channel speech signal as input and to generate a virtual channel speech signal, to learning. The learning stage of the VACENet may be divided into two stages: pre-training and fine-tuning. The reason for having to perform pre-training is that if the VACENet is randomly initialized, virtual channel speech signals are generated randomly, and thus, it becomes ineffective as an input to the WPE.

The VACENet is basically configured to receive the real and imaginary parts of STFT coefficients that can be obtained by taking the short-time Fourier transform (STFT) on the observed single-channel speech signal, and to output the RI component of the virtual channel speech signal.

In the pre-training stage, the VACENet is subjected to learning to simply estimate the same real and imaginary parts as the input, and this is done under the assumption that the actually observed dual-channel signals will not differ much from each other. The pre-training process can be performed independently regardless of the deep neural network WPE.

After the pre-training process is completed, in order to proceed with fine-tuning, the VACENet is integrated with the neural WPE to construct the VACE-WPE system proposed in the present invention (i.e., a WPE-based dereverberation apparatus using virtual acoustic channel expansion based on a deep neural network).

In the fine-tuning stage, the VACENet is subjected to learning so that the output signal, derived by passing the generated virtual channel speech signal along with the actually observed single-channel speech signal through the dual-channel WPE, approaches the early-arriving signal.

The types of loss functions used in the pre-training and fine-tuning processes are defined in Eq. 7 to Eq. 9.

In a brief description of the structure of the VACE-WPE system proposed in the present invention through a block diagram in relation to what is shown in FIG. 1, the signal generation unit 200 may generate a virtual channel speech signal through VACENet by using a given single-channel speech signal.

The power estimation unit 300 may include a deep neural network used to estimate the power of the main signal of the speech signal.

The dereverberation unit 400 may remove reverberation from a dual-channel speech signal consisting of a single-channel signal and a generated virtual channel signal by using the dual-channel WPE algorithm.

However, after configuring the structure as described above, in order to perform learning so that the dual-channel WPE puts out an output signal that exhibits better dereverberation performance than the single-channel WPE, the pre-learning of the VACENet must be performed in priority. This is because if the learning is proceeded immediately in a randomly initialized state without performing the pre-learning of the VACENet, virtual channel signals may also be randomly generated, and thus, the WPE algorithm may not work properly.

Pre-training of the VACENet may be carried out by performing a self-regression task to put out the same signal also at the output terminal as the single-channel speech signal used at the input terminal of the VACENet.

The reason is that it is assumed that if dual-channel speech signals are given by actually using a dual-channel microphone rather than a virtual channel, there will be no significant difference between the two signals. In fact, the VACENet may be subjected to learning to minimize $L_1(X_v, X_1)$ in the pre-learning stage. In other words, the VACENet may be subjected to learning so that $X_v$ approaches $X_1$.

In the following, a method of fine-tuning the virtual acoustic channel expansion deep neural network (VACENet) will be described.

After the pre-learning of the VACENet is completed in a manner of restoring an inputted signal as it is, it may be subjected to learning so that the dual-channel WPE can put out an output signal closer to the dereverberated signal than the single-channel WPE by actually fine-tuning the VACENet.

At this time, the deep neural network of the power estimation unit 300 (hereinafter, LPSNet) serving to estimate the power of an early-arriving signal out of the components of the deep neural network-based WPE is not subjected to learning together during the learning process of the VACENet, and may only be used to estimate the power of the early-arriving signal, with the learning stopped.

In the fine-tuning stage, the parameters of the VACENet may be subjected to learning in the direction of minimizing $L_1(Z_1, X_1^{(1)})$. That is, the learning is performed for the purpose of bringing the output signal of the dual-channel WPE closer to the ideal early-arriving signal.

Figure 5:
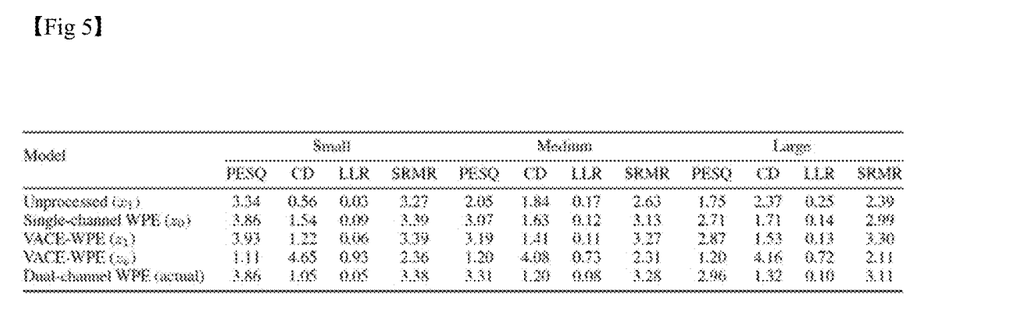
FIG. 5 is a table showing the comparison between the performance of the WPE-based dereverberation apparatus in accordance with an embodiment of the present invention and the performance of various dereverberation algorithms.
Figure 6:
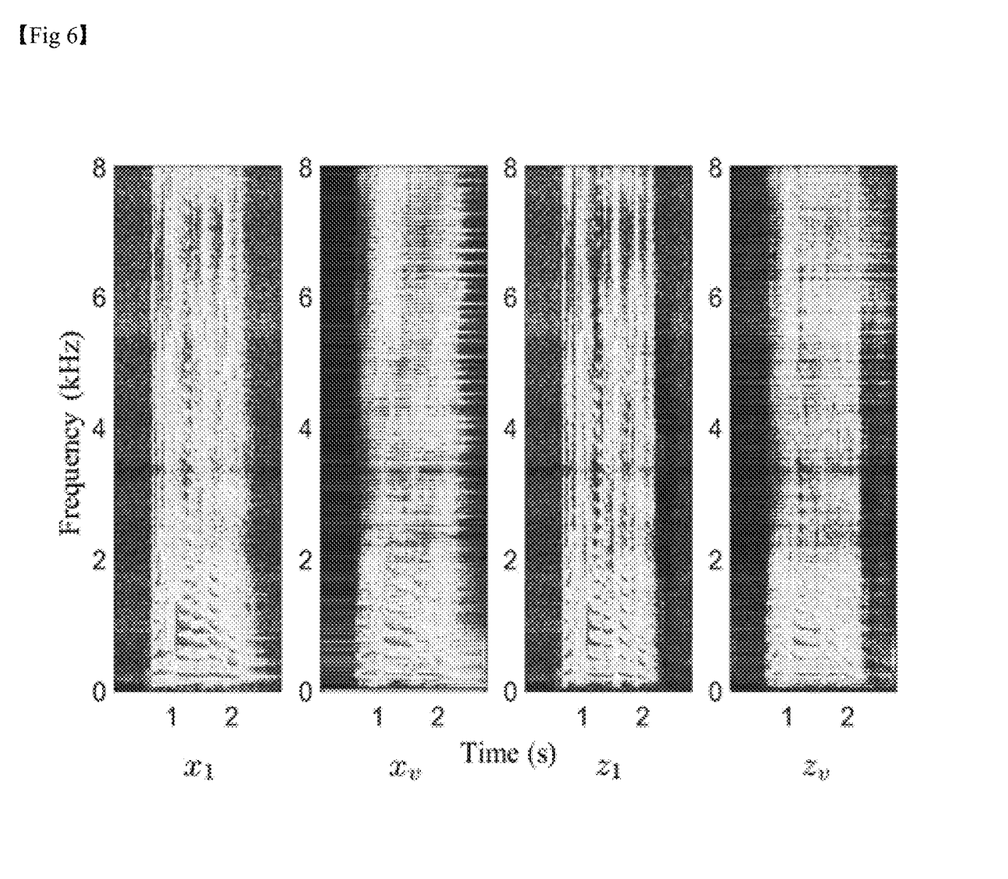
FIG. 6 is a diagram illustrating spectrograms of input and output signals of the WPE-based dereverberation apparatus in accordance with an embodiment of the present invention.

FIG. 5 is a table showing the comparison between the performance of the WPE-based dereverberation apparatus in accordance with an embodiment of the present invention and the performance of various dereverberation algorithms. FIG. 6 is a diagram illustrating spectrograms of input and output signals of the WPE-based dereverberation apparatus in accordance with an embodiment of the present invention.

In the following, a performance experiment method and experiment results of the WPE-based dereverberation apparatus in accordance with an embodiment of the present invention will be described with reference to FIGS. 5 and 6.

First, all experiments were conducted using the TIMIT English speech database DB. The TIMIT DB is a public DB frequently used in dereverberation or denoising experiments. For the experiment, first, all utterances having a duration of 2.8 seconds or less were removed from the entire DB, and a small quantity of the remaining utterances was separated and used as a validation set. As a result, it was possible to obtain 3,023 utterances from 462 speakers as a training set, 458 utterances as the validation set, and 1,344 utterances from 168 speakers as a test set.

In order to subject the VACENet to learning, since it is necessary to contaminate the clean speech signal utterances of the TIMIT DB with reverberation and then to proceed with learning to remove it, a room impulse response set (RIR set) to be used for contaminating with reverberation is needed. In the experiments of the present invention, a simulated RIR set frequently used in speech recognition and speaker recognition scripts of the Kaldi toolkit was used. This is also public data and is a known DB used by many researchers.

This simulated RIR DB contains RIRs generated through simulations in a small room, a medium room, and a large room.

However, in the experiments of the present invention, first, the small room RIR was not used in the experiments. The training RIR set consisted of 16,200 medium room RIRs and 5,400 large room RIRs, and the validation RIR set consisted of 1,800 medium room RIRs and 600 large room RIRs.

The RIR DB used to construct an evaluation set for comparing and evaluating the WPE-based dereverberation apparatus proposed in the present invention is real RIRs provided by REVERB Challenge 2014, and is not artificially generated but actually recorded RIRs, unlike the simulated RIRs used for learning. The corresponding RIR set includes eight (8) RIRs for each of the small, medium, and large rooms. The reverberation time RT60 for each room is about 0.25, 0.5, and 0.7 seconds, respectively. Each RIR consists of a total of 8 channels, but only the first channel was used in this experiment.

First, speech samples contaminated with reverberation had a sampling frequency of 16 kHz, and were converted into STFT domain signals by using a window size and a hop size of 64 ms and 16 ms. The FFT size used at this time was 1,024, and accordingly, 513-dimensional log-scale power spectra (LPS) were used as an input to the LPSNet, and a feature obtained by stacking the real and imaginary parts of the 513-dimensional STFT coefficients on the channel axis was used as an input to the VACENet.

A structure proposed previously in another research paper was adopted for the structure of the LPSNet. The paper is "Monaural speech enhancement with dilated convolutions," S. Pirhosseinloo and J. S. Brumberg, in Proc. Interspeech, 2019.

The structure proposed in the above paper is of a structure that first applies the 2D convolution (Conv2D) operation and the max pooling operation to the input feature several times, and then stacks dilated 1D convolution (Conv1D) blocks in a plurality and processes them.

In the present invention, the kernel size of the Conv2D was reduced from (9, 9) to (5, 5) in that structure, and the number of channels was reduced from (32, 64) to (24, 48), respectively. In addition, the number of dilated Conv1D blocks was increased from 2 to 4 for use.

The input LPS feature was normalized through a learnable batch normalization layer.

Batch normalization was applied to the input feature likewise in the VACENet as well, and at this time, batch normalization was applied separately to the real part and the imaginary part, separately.

On the other hand, the real and imaginary parts outputted were normalized at the output terminal of the VACENet using pre-calculated global mean and variance statistics.

After each Conv2D or transposed Conv2D operation in the structure of VACENet, batch normalization and an exponential linear unit (ELU) activation function were used.

In the final VACE-WPE system, the delay A of the linear prediction filter in the WPE algorithm was set to 3, and the number of taps K was set to 20.

An on-the-fly data generator was used when configuring a mini-batch for model learning. This method uses a method in which one piece of clean speech data is selected randomly from a given speech dataset for learning, one RIR is selected randomly from an RIR dataset, and then arbitrary reverberated speech is created through the convolution of these two signals, and reverberated speech utterances generated randomly in this way were bundled in the unit of four to be used as one mini-batch.

At this time, the speech data is cropped in an arbitrary interval so as to have a length of 2.8 seconds before convolution. One training epoch for deep neural network learning was defined as an iteration for 6,000 mini-batches.

The values of $\alpha=0.3$ and $\beta=20$ were used in Eq. 7 and Eq. 9, and these values were determined by checking out the loss values in the early stage of learning. All the deep neural networks were subjected to learning through Adam optimizer, and $10^{(-4)}$ was used as the initial value of the learning rate in the pre-training stage of the LPSNet and VACENet, and $5*10^{(-5)}$ was used as the initial value of the learning rate in the fine-tuning stage of the VACENet.

The learning rate was reduced to half each time the validation loss failed to exhibit the lowest value twice in a row. Further, dropout and gradient clipping played an important role in normalizing and stabilizing learning, and at this time, the dropout rate was set to 0.3 and the global norm value for gradient clipping was set to 3.0.

All the weights of the deep neural network were normalized by a scaling factor of $10^{-.5}$.

Finally, the number of filter taps K of the WPE algorithm was set to 10 only in the learning stage through the experiments. This is because if the number of taps of the linear prediction filter is not reduced as described above, a loss value that is too small is generated from the initial stage of training, and thus learning does not proceed properly.

The WPE-based dereverberation apparatus using virtual acoustic channel expansion based on a deep neural network proposed in the present invention was compared with and evaluated against a single-channel WPE using only actually observed single-channel speech and a dual-channel WPE using actual dual-channel speech. The number of filter taps for the single-channel WPE was set to 60, and the number of filter taps for the actual dual-channel WPE was set to 20. Further, here, the actual second channel signal was generated using the RIR of the 5th channel facing the 1st channel out of REVERB Challenge 2014 RIRs of a total of 8 channels.

The dereverberation performance of each algorithm was evaluated through perceptual evaluation of speech quality (PESQ), the cepstrum distance (CD), log-likelihood ratio (LLR), or the non-intrusive signal-to-reverberation modulation energy ratio (SRMR).

An early-arriving signal of an actually observed signal was used as the reference signal used when calculating the above evaluation metric.

Referring to FIG. 5, there is shown a comparison between the performance of the WPE-based dereverberation apparatus using virtual acoustic channel expansion based on a deep neural network in accordance with an embodiment of the present invention and the performance of other dereverberation algorithms.

The second row shows the evaluation results for the single-channel WPE output signal, which is denoted by $z_0$. The third and fourth rows show the performance for the actual channel output and virtual channel output of the VACE-WPE algorithm proposed in the present invention, which are denoted by $z_1$ and $z_v$, respectively.

The first row shows the performance for the reverberated speech signal $x_1$ without using a dereverberation algorithm, and the last row shows the performance for the first channel output signal (actual) of the dual-channel WPE algorithm using the actual dual-channel speech signal.

First, in an analysis of the performance in the medium room and the large room, it can be seen that through the comparison of the first three rows of the table, the performance is improved when using the WPE algorithm over the cases where no processing has been done.

Moreover, it can be seen that the proposed VACE-WPE method $z_1$ shows better performance than the conventional single-channel WPE $z_0$, which means that it is possible to generate, via the deep neural network, a virtual channel speech signal that is effective as a second channel input of a dual-channel WPE through the dereverberation apparatus proposed by the present invention.

However, the dual-channel WPE algorithm that has removed the reverberation through the actual dual-channel speech still shows somewhat better performance than the VACE-WPE method that has removed the reverberation through the virtual channel speech signal.

On the other hand, it can be appreciated that the virtual channel speech signal $z_v$ generated through the proposed method exhibits completely different characteristics from the rest of the signals. In terms of only the performance measured through the evaluation metric, it can be observed that the virtual channel speech signal $z_v$ shows the worst performance, and the performance difference is very large.

FIG. 6 is a diagram illustrating spectrograms of input and output signals of a WPE-based dereverberation apparatus in accordance with an embodiment of the present invention in a large room environment.

Referring to FIG. 6, it can be seen that the virtual channel speech signal $x_v$ generated exhibits a completely different spectral pattern from the actually observed speech signal $x_1$, and it can be observed that $z_1$ obtained by passing this through the WPE also exhibits completely different characteristics from $z_v$.

Nevertheless, it can be confirmed that the reverberation component of the output signal $z_1$ of the WPE corresponding to the actually observed speech signal $x_1$ channel has reduced in the overall frequency range compared to the actual observed speech signal $x_1$.

Next, in a survey of the performance in the small room, it can be seen that the overall performance is much better than the performance in the medium and large rooms.

In addition, it can be seen that the performance of different WPE algorithms is similar to each other in terms of PESQ, LLR, and SRMR. However, $z_v$, the virtual channel output signal of the WPE, showed completely different characteristics from the rest of the signals as in the medium and large rooms.

On the other hand, in the small room, the unprocessed signal, i.e., the signal containing reverberation, showed the lowest CD value, and this is because the small room acoustics is an unfamiliar environment that has not been taken into account during learning.

Also, it may occur because of the fact that the number of taps of the linear prediction filter has a relatively large value for use in a small room environment. This is because while the single-channel and dual-channel WPE algorithms used filter taps of 60 and 20, respectively, which are somewhat too high values for use in a small room environment where the reverberation component was not that high, the reverberation component was estimated and removed excessively when such numbers of filter taps were used, thereby removing even the speech components that should not have been removed, which might have highly likely caused distortion in the output signal.

To summarize the results, the VACENet of the WPE-based dereverberation apparatus using virtual acoustic channel expansion based on a deep neural network in accordance with an embodiment of the present invention is subjected to learning to generate a virtual auxiliary speech signal that allows better removal of reverberation components through MIMO (multi-input multi-output) WPE algorithms by simply using an observed single-channel speech signal, and the virtual channel signal generated does not seem to have any microphone array characteristics.

The reason the actual channel output signal of the VACE-WPE shows better dereverberation performance than the output signal of the single-channel WPE even though the virtual channel input/output signal of the VACE-WPE exhibits very different characteristics from the actual signal as described above is that since the dual-channel WPE operates based on multi-channel linear prediction (MCLP), it can be said that the underlying algorithm itself is fundamentally different from the single-channel WPE.

Therefore, the WPE-based dereverberation apparatus using virtual acoustic channel expansion based on a deep neural network in accordance with an embodiment of the present invention has the potential for development through the generation of virtual channels, and at the same time, a neural network may more accurately calculate an early-arriving speech signal or a late reverberation signal through MCLP algorithms.

On the other hand, the constitutional elements, units, modules, components, and the like stated as "~part or portion" in the present invention may be implemented together or individually as logic devices interoperable while being individual. Descriptions of different features of modules, units or the like are intended to emphasize functional embodiments different from each other and do not necessarily mean that the embodiments should be realized by individual hardware or software components. Rather, the functions related to one or more modules or units may be performed by individual hardware or software components or integrated in common or individual hardware or software components.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof.

The processes and logic flows described in this specification can be performed by one or more programmable processors executing one or more computer programs to perform functions by operating on input data and generating output.

This written description sets forth the best mode of the present invention and provides examples to describe the present invention and to enable a person of ordinary skill in the art to make and use the present invention. This written description does not limit the present invention to the specific terms set forth.

While the present invention has been shown and described with reference to certain embodiments thereof, it will be understood by those skilled in the art that various changes in forms and details may be made therein without departing from the spirit and scope of the present invention as defined by the appended claims and their equivalents. Therefore, the technical scope of the present invention may be determined by on the technical scope of the accompanying claims.

What is claimed is:

1. A WPE-based dereverberation apparatus using virtual acoustic channel expansion based on a deep neural network, comprising:
    a signal reception unit for receiving as input a first speech signal through a single channel microphone;
    a signal generation unit for generating a second speech signal by applying a virtual acoustic channel expansion algorithm based on a deep neural network to the first speech signal; and
    a dereverberation unit for removing reverberation of the first speech signal and generating a dereverberated signal from which the reverberation has been removed by applying a dual-channel weighted prediction error (WPE) algorithm based on a deep neural network to the first speech signal and the second speech signal.

2. The WPE-based dereverberation apparatus using virtual acoustic channel expansion based on a deep neural network of claim 1, wherein the signal generation unit receives a real part and an imaginary part of an STFT coefficient of the first speech signal as input, and outputs a real part and an imaginary part of an STFT coefficient of the second speech signal.

3. The WPE-based dereverberation apparatus using virtual acoustic channel expansion based on a deep neural network of claim 2, further comprising:
    a power estimation unit for estimating power of the dereverberated signal of the first speech signal, based on the first speech signal and the second speech signal by using a power estimation algorithm based on a deep neural network.

4. The WPE-based dereverberation apparatus using virtual acoustic channel expansion based on a deep neural network of claim 3, wherein the power estimation unit provides a power estimation value of the dereverberated signal to the dereverberation unit, and
    the dereverberation unit removes the reverberation included in the first speech signal by using the power estimation value.

5. The WPE-based dereverberation apparatus using virtual acoustic channel expansion based on a deep neural network of claim 4, wherein after the power estimation algorithm of the power estimation unit is subjected to learning to receive the first speech signal containing a reverberation component as input and to estimate the power of the dereverberated signal, the virtual acoustic channel expansion algorithm of the signal generation unit is subjected to learning.

6. The WPE-based dereverberation apparatus using virtual acoustic channel expansion based on a deep neural network of claim 5, wherein the learning of the virtual acoustic channel expansion algorithm of the signal generation unit comprises a pre-training stage and a fine-tuning stage, and
    the pre-training stage is carried out by performing a self-regression task that allows the virtual acoustic channel expansion algorithm to estimate the same real part and imaginary part as an inputted signal.

7. The WPE-based dereverberation apparatus using virtual acoustic channel expansion based on a deep neural network of claim 6, wherein in the fine-tuning stage, the virtual acoustic channel expansion algorithm is subjected to learning so that an output signal derived by passing a virtual channel speech signal and an actually observed speech signal through dual-channel WPE approaches an early-arriving signal.

8. The WPE-based dereverberation apparatus using virtual acoustic channel expansion based on a deep neural network of claim 7, wherein the power estimation algorithm is not subjected to learning during the pre-training stage and the fine-tuning stage.

9. The WPE-based dereverberation apparatus using virtual acoustic channel expansion based on a deep neural network of claim 1, wherein the virtual acoustic channel expansion algorithm has a U-Net architecture using a gated linear unit (GLU) instead of a general convolution operation.

10. The WPE-based dereverberation apparatus using virtual acoustic channel expansion based on a deep neural network of claim 9, wherein the virtual acoustic channel expansion algorithm performs a 2D convolution operation with a stride of (2, 2) without performing max-pooling when down-sampling a feature map.

* * * * *